FIG. 13.

Patented Jan. 6, 1953

2,624,659

UNITED STATES PATENT OFFICE 2,624,659

COMPENSATING BLAST CONTROL DEVICE

John S. Haug, Chestnut Hill, Pa., and Charles A. Mengers, Oaklyn, N. J., assignors to United Engineers & Constructors Inc., Philadelphia, Pa., a corporation of Delaware Application April 11, 1946, Serial No. 661,316

18 Claims. (Cl. 48—83)

A principal object of the present invention is to provide a functionally improved device for controlling the blast rate in a water gas set.

The invention will be described, for convenience, in its use and application to carburetted water gas apparatus, although, as will be readily understood by those skilled in the art, the invention may be advantageously employed in blue water gas sets as well.

A carburetted water gas set in its most conventional form comprises three vessels connected in series and designated respectively the generator, the carburetter and the superheater. The generator contains a relatively deep bed of ignited fuel, which is alternately blasted with air and reacted with steam in a cyclic operation. In the air blast portion of the cycle, known as the "blow" period of the cycle, the blasting of the fuel bed with primary air stores heat therein and generates combustible blast gases which, on issuing from the fire, are burned with secondary air admitted to the top of the generator or in the neighborhood of the entrance of the blast gases to the carburetter, the burning blast gases and the resulting products of combustion being passed through the carburetter and superheater to the stack valve, and thence through the stack to the atmosphere. In this operation, the temperature of the refractory heat storage material in the carburetter and superheater, and in the generator top if the secondary combustion is initiated therein, is raised to say 2000° F., and heat is stored therein for the subsequent vaporization and gasification of the carburetting oil.

After the "blow" period of the cycle, the air blast is discontinued and steam is passed through the generator fuel bed, in an operation known as the "run" period of the cycle, in which a combustible gas is formed by decomposition of the steam to hydrogen and oxygen and the union of the latter with the carbon of the fire. The steam is usually passed alternately up and down through the fuel bed, and the steam passed down through the fuel bed is frequently supplied to the superheater top and passed reversely through the set. The "water gas" produced during the "up-run" passes from the fuel bed through the generator top and thence through the carburetter and superheater, and is carburetted or enriched to a higher calorific power with oil gas produced by the introduction of petroleum oil into the generator top and/or into the carburetter. Since the stack valve is closed, the resulting mixed gas, known as carburetted water gas, passes through a water seal to the condensing, purifying and storage system. The water gas produced during the "down-run" or "back-run" usually is passed directly from the base of the generator through the water seal, and may or may not be accompanied by gas produced by introducing oil to the set and cracking the resulting oil vapors as they pass, with the steam, through the fuel bed. The "run" period of the cycle is followed by a second "blow" period and the cycle is repeated.

Figure 13:
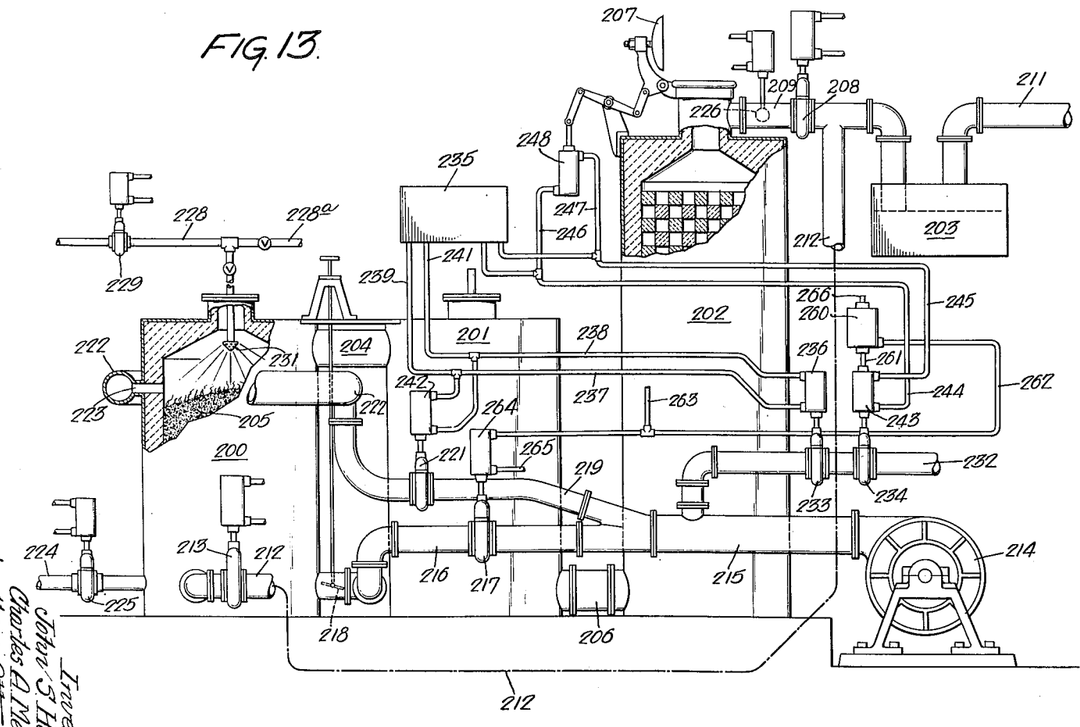
Fig. 13 is a diagrammatic elevational and partial sectional view illustrating still another modification.

In the following general description, the secondary air for the combustion of the blast gases produced in the fire is assumed to be introduced to the set in the neighborhood of the entrance of the blast gases to the carburetter and, for convenience, is frequently hereinafter termed the "carburetter blast," or the "carburetter air," the primary air which is passed through the fuel bed being termed the "generator blast." It is to be understood, however, that, as above indicated, the secondary air may be introduced elsewhere, for example to the generator as shown in Fig. 13.

In apparatus of this character, maximum production capacity is dependent in part upon the maximum permissible blasting rate. It has been found in practice that there is a tendency for the blast to blow over a certain amount of fuel from the generator in the form of fines, and generally the blast rate is set so as to keep the blown-over fuel within reasonable limits, say around 1 to 1¼% of the total fuel charged. With good water gas fuel, such as lump coke, it is possible to maintain a relatively high rate of blast with comparatively little blown-over fuel, but any increase of rate beyond a given maximum will invariably result in a considerable increase in such blow-over. Under the higher blast rates, channels are formed in the fire bed with the production therein of blast velocities high enough to carry large lumps of fuel out of the fire. Maximum capacities can be obtained, therefore, only by close limitation of the blast rate at a maximum consistent with a reasonable loss of fuel by blow-over from the generator fuel bed.

The aforesaid condition is complicated by the fact that normally a common blower supplies both the primary blast air and the secondary air required for complete combustion of the generator gases after they leave the fire. At the end of the "blow period" the secondary or carburetter air shuts off in advance of the primary or generator air and this sudden reduction in delivery from the blower causes a surge of blast pressure and resultant surge in blast rate, so that if the generator blast rate is set at the aforesaid permissible maximum, the sudden increase will blow out a considerable amount of fuel in each cycle. It becomes necessary, therefore, to set the generator blast rate at a lower value than the otherwise acceptable maximum so that, when the carburetter air shuts off, the aforesaid increased blast rate through the generator fire will not exceed the normal maximum rate.

It has been found, for example, that when the generator air rate is set at 20,000 cu. feet per minute, a surge will occur when the carburetter air is shut off which will cause an increase in rate to say 24,000 cu. feet per minute. If 20,000 cu. feet is the desirable maximum rate, therefore, it would be necessary to restrict the normal operating rate of the generator blast to say 16,700 cu. feet so as to prevent an excessive loss of fuel by blow-over when the surge occurs. It will be apparent that this restriction of the normal operating rate will result in a loss of 20% in gas-making capacity.

The situation is further complicated by the fact that at the end of the gas-making run, when the set is full of good gas, it is customary, instead of blowing this good gas out to atmosphere, to introduce a "blast purge period." This purge period is effected by causing the generator blast valve to open while the stack valve is still closed so that the resulting blast will purge the good gas out of the set through the wash box into the holder. The stack valve is then timed to open as soon as the set is adequately purged.

It is also customary in many plants to make what is termed a "blow run." At the end of the blasting period, the gases from the generator are the richest, and instead of wasting these gases to the air, the stack valve is closed and the blow is continued so that a quantity of these rich producer gases may be recovered through the wash box to the works gas system. Since the back pressure is much greater when the stack valve is closed, the generator blast rate drops to say ¾ of the normal blast rate, and in order to adequately purge the apparatus and also to obtain a sufficient quantity of "blow run" gases, it is necessary to prolong these periods beyond the time that would be required if the blast rate were not so reduced. A loss of gas-making time thereby results.

A specific object of the present invention is to provide a novel blast-rate control device which will avoid the losses in gas producing capacity arising from the several causes outlined above.

Certain preferred embodiments of the invention are illustrated in the attached drawings wherein.

Figures 1, 2, 3:
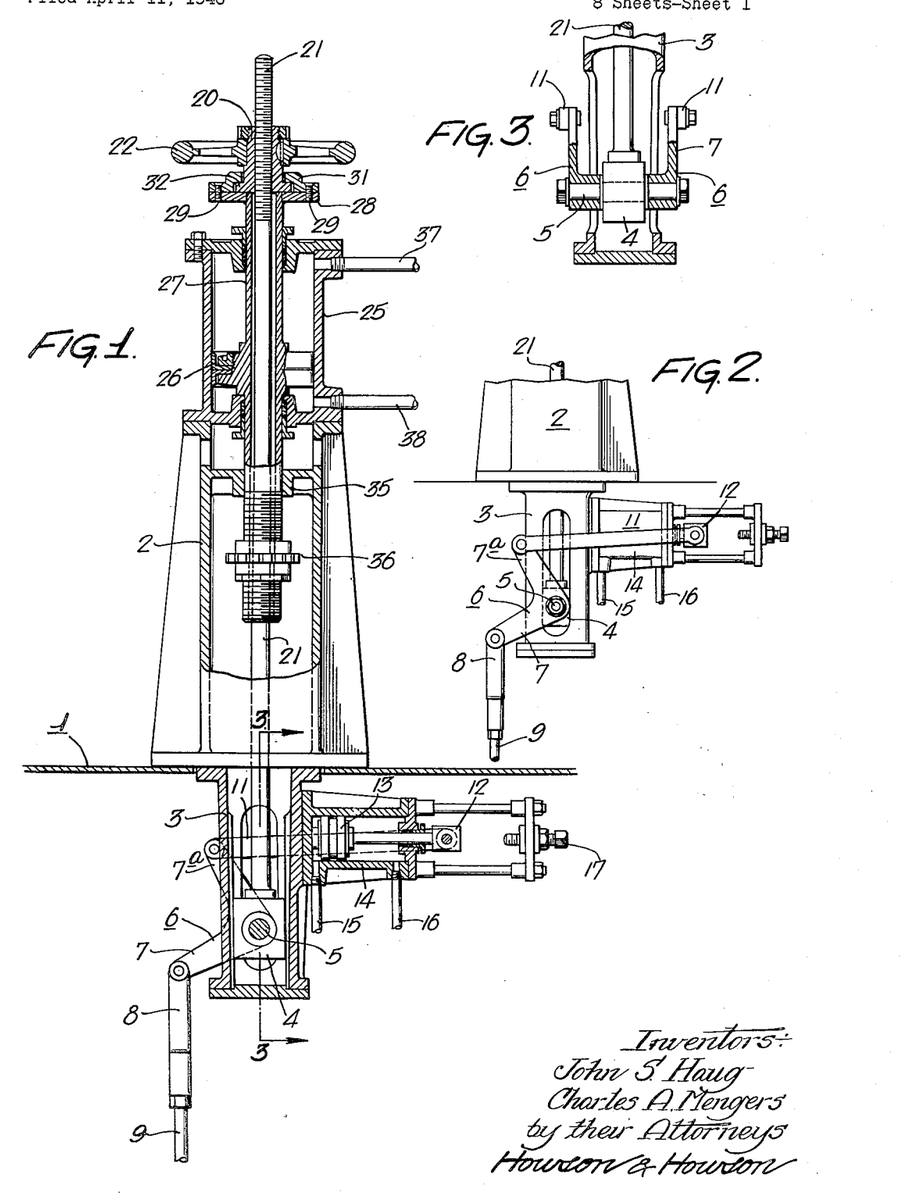
Fig. 1 is a partial vertical sectional view of the compensating blast control device.
Fig. 2 is a fragmentary side elevational view showing details of a portion of the apparatus.
Fig. 3 is a sectional view on the line 3—3, Fig. 1.
Figure 4:
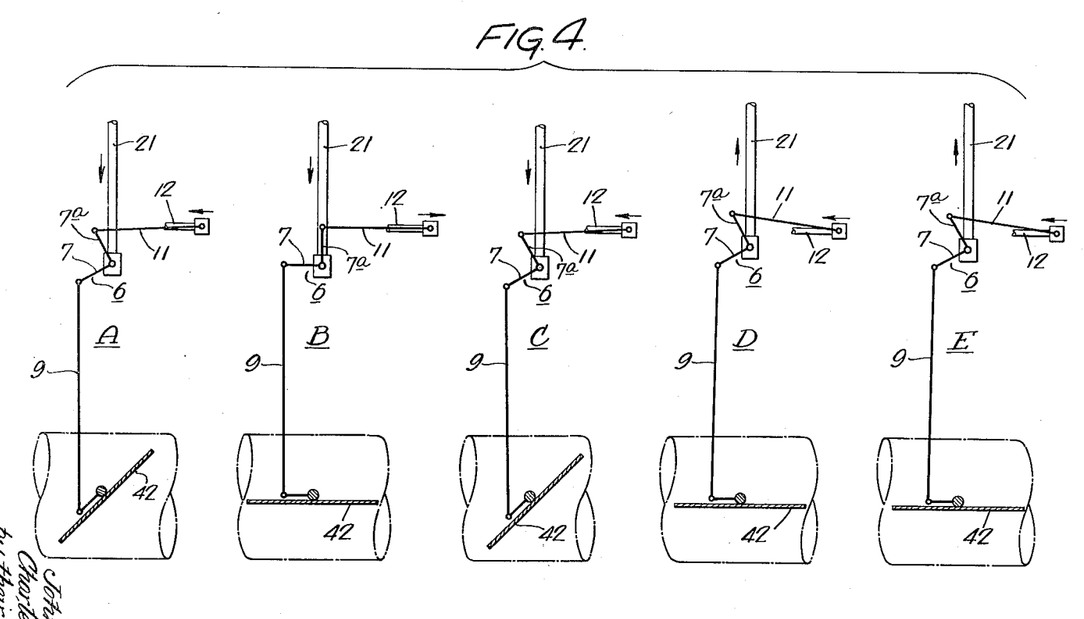
Fig. 4 is a diagrammatic view showing a sequence of operations of the apparatus illustrated in Figs. 1, 2, and 3.

With reference to the drawings, the blast control device may be mounted conveniently on the operating floor which has been indicated in the present instance by the line 1. The device consists of a suitable frame or casing 2 having at its lower end a vertical guide portion 3 within which is slidably mounted a cross head 4. The cross head carries a transverse pin 5 and through the medium of this pin a bell crank lever 6 is pivotally attached at each side of the cross head. The corresponding arms 7 of the levers are connected through a suitable yoke 8 and a common connecting rod 9 to the generator blast control damper 42 (see Fig. 4), the arrangement being such that an upward movement of the rod moves the damper toward open position, whereas downward movement of the rod tends to close the damper.

The corresponding arms 7a of the levers 6 are connected through links 11 with the outer end of the piston rod 12 of a piston 13 which operates in an hydraulic cylinder 14 connected to the frame 2. Obviously with this connection, any movement of the piston 13 will result in a corresponding movement of the lever 6 and consequent adjustment of the generator blast control damper. The cylinder 14 is connected by way of pipes or ducts 15 and 16 to the hydraulic system which controls the secondary blast, and the connection is such that as the secondary blast is cut off the piston 13 will move in a direction to close the generator blast control damper to thereby compensate for the increase in blast air pressure resulting from the stoppage of the secondary blast. The travel of the piston 13 may be regulated in the present instance through the medium of an adjustable stop screw 17.

Extending upwardly from the cross head 4 is a rod 21 which at its upper end is threaded for engagement with a nut 20 to which is secured a hand wheel 22. By actuation of the nut through the hand wheel the cross head may be adjusted in the guide 3 to thereby manually regulate the adjustment of the generator blast control damper, and it is to be noted that this manual adjustment may be effected entirely independently of the regulation effected through the piston 13 as described above.

In the upper end of the frame 2 is a hydraulic cylinder 25 within which operates a piston 26. This piston is connected to a hollow piston rod 27 which loosely embraces the rod 21. The upper end of the hollow piston rod carries a flange 28 which is connected by screws 29 to a cap flange 31, and confined for rotation between the flanges 28 and 31 is a flange 32 of the nut 20. The nut projects upwardly through an aperture in the cap flange 31 and at its upper end receives the hand wheel 22. This device permits longitudinal adjustment of the connecting rod 21 through the medium of the nut 20, as previously described, independently of the piston 26; but movement of the piston in its cylinder necessarily entails a corresponding longitudinal movement of the rod 21.

The lower end of the hollow piston rod 27 passes through a guide 35 in the frame and is externally threaded for reception of an adjustable stop element 36 in the form of an internally threaded collar. This stop element acts by engagement with the guide 35 to limit the upward travel of the piston 26 in its cylinder, and the extent of the travel may be regulated by adjustment of the element 26 longitudinally of the piston rod.

The cylinder 25 is connected by way of ducts 37 and 38 with the hydraulic system which controls the position of the stack valve so that any movement of that valve is accompanied by a corresponding movement of the piston 26. The connection of the cylinder 25 with the aforesaid hydraulic system is such that actuation of the system to move the stack valve toward the closed position will result in an upward movement of the piston 26 and a resulting movement of the generator blast control damper toward its maximum open position.

Figure 10:
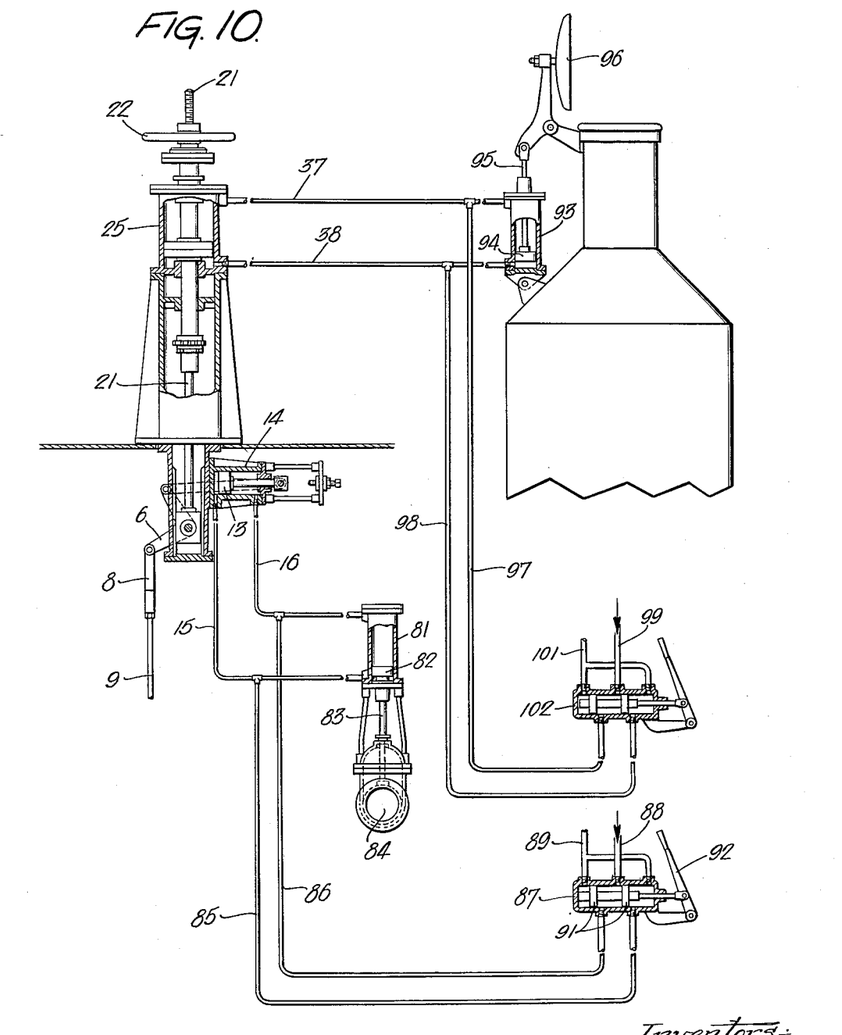
Fig. 10 is a diagrammatic view showing the hydraulic control system associated with the apparatus shown in Figs. 1, 2, and 3.

The aforesaid hydraulic systems which operate the stack valve and the carburetter or secondary blast valve are illustrated diagrammatically in Fig. 10. In this figure the elements of the device shown in Figs. 1, 2, and 3 are indicated by the same reference numerals used in the last-named figures, and the elements are shown in the same relative positions.

The ducts 15 and 16 extend to the opposite ends of a cylinder 81. Within this cylinder is a piston 82 which is connected through a rod 83 with the carburetter blast valve 84. The ducts 15 and 16 are connected through pipes 85 and 86 and a valve 87 with a source of fluid pressure, said source being indicated in the present instance by a pressure line 88 and a return line 89. The valve 87 comprises a slide valve element 91 which in the position shown connects the line 88 with the pipe 86 and through this pipe with the duct 16, whereby fluid pressure is applied to the upper end of cylinder 81, and to the right hand end of cylinder 14. In this setting of the valve element 91 the pipe 85 is connected, as shown, to the return line 89 and is free from pressure. The valve 84 is closed.

The valve element 91 when moved to the right from the position shown in Fig. 10 reverses the connections described above, connecting the pipe 85 with the pressure line 88 and the pipe 86 with the return line 89. Such reversal results in forcing the piston 82 to the top of cylinder 81, thus opening the valve 84 and shifts the piston 13 to the right of cylinder 14 with results hereinafter described. The valve element 91 may be shifted manually from one of said positions to the other by a lever 92.

The ducts 37 and 38 connect the cylinder 25 with a cylinder 93 which contains a piston 94, and this piston is connected through a rod 95 with the stack valve 96. When the piston is at the bottom of the cylinder and in this position of the piston the valve 96 is open, as shown. The ducts 37 and 38 are also connected through pipes 97 and 98 with a source of fluid pressure as represented by a pressure line 99 and a return line 101, and this connection is controlled by a manually operated valve 102 of the same character as the valve 87. When the valve is in the setting shown the pipe 97 is connected to the pressure line 99 and the return line 101 to the pipe 98. When the valve is shifted to the right the connections are reversed as described below.

The operation of the device is as follows:

Let it be assumed that the "blow period" of the carburetted gas set has just been initiated. At this moment the stack valve 96 is opened. The secondary blast valve 84 is closed and the primary blast damper is in a partially open condition as indicated, for example, in view A of Fig. 4. Under these conditions the blast purge piston 26 is in its low position as illustrated in Figs. 1 and 10, this corresponding to the open position of the stack valve, and the piston 13 is at the left end of the cylinder 14, this position of the piston 13 corresponding to the closed position of the secondary or carburetter blast valve 84. Under these conditions the rod 9 is depressed and the generator blast control damper 42 is in position A of Fig. 4. The secondary or carburetter blast valve is immediately opened with the result that the piston 13 moves to the right in its cylinder 14 to a position regulated by the stop 17, this movement of the piston having the effect of actuating the bell crank lever 6 so as to elevate the rod 9 and to thereby further open the damper as illustrated at B in Fig. 4. The "blow period" now advances to the point where the secondary or carburetter blast is interrupted in preparation for the "blow run" by closure of the valve 84 with the result that the piston 13 again moves to the left hand end of its cylinder, this movement of the piston 13 effecting a depression of the rod 9 through action of the bell crank 6 and thereby returning the generator blast control damper to a position C corresponding to position A. This automatic adjustment of the damper to cut down the generator blast compensates for the shutting off of the secondary or carburetter blast and maintains the blast rate approximately constant as and for the purpose previously described.

The "blow run" is now initiated by closing the stack valve, this closure of the valve having the effect of shifting the piston 26 from its lower position, which it occupies when the valve is open, to the elevated position corresponding to the closed position of the stack valve. This upward movement of the piston 26 elevates the cross head 4 and the rod 9 and thereby returns the generator blast control damper to the fully opened position as illustrated at D in Fig. 4. The resulting increase in the blast damper opening compensates for the increases in back pressure resulting from the closing of the stack valve and thereby maintains the rate of blast during the "blow run" and reduces the time required otherwise for this operation.

The "run period" is now instituted by completely interrupting the generator blast by way of the generator blast valve not shown, the damper and the other elements of the aforedescribed control device remaining in the position which they occupied at the end of the "blow run."

At the end of the "run period" the blast purge is initiated. This is effected by interrupting the admission of steam and reinstituting the generator blast. The stack valve and the secondary or carburetter blast valve remain closed and the generator blast damper remains in the fully opened position as during the "blow run." At the termination of the "blast purge" the "blast" or "blow period" is again instituted by opening the stack valve which results in a downward movement of the piston 26 to the bottom of the cylinder 25 which shifts the valve again to position A and thereby completes the cycle.

In the aforedescribed cycle of operations it is to be noted that the generator blast control damper is never moved to a fully closed position. If this should be required, however, for any purpose, the damper may be adjusted from position A, Fig. 4 to a vertical or fully closed position by depression of the rod 21 through the medium of the hand wheel 22, or by the same wheel the rate of blast may be adjusted to any intermediate rate desired.

It will be apparent that the amount of compensation afforded by the device for the "blow run" and "blast purge" may be reduced or increased as required by adjustment of the stop 36 which limits the upward travel of the piston 26 in its cylinder. It is to be noted further that the compensation for "blast purge" and "blow run" is not limited by the compensation for loss of secondary blast because of the manner in which the piston 13 operates through the bell crank levers 6 independently of the position of the cross head 4. By reason of the fact that the links 11 operate at right angles to the direction of movement of the cross head in the "blast purge" compensation, the compensating movements of the cross head involve only a small angular movement of the bell cranks, and this movement of the cranks is relatively small in relation to the length of the rods 11. In effect the bell crank constitutes a lost motion device in the transmission connecting the stack valve with the damper which makes possible movement of the damper by the piston 13 without affecting the position of the stack valve. Similar lost motion provision is made in the embodiments of the invention hereinafter described and illustrated in Figures 5 to 12 inclusive.

The invention makes possible a material increase in the gas generating capacity of water gas sets and similar apparatus. This is of material consequence in view of increasing plant costs and the difficulty of installing apparatus for increased capacity on limited ground space. The blast limitation is the most frequent cause for limited generating capacity, and an increase in blast rate affords a shorter blast period and will thereby increase the proportion of gas-making time per hour. The device of the present invention makes possible a material increase in gas-making capacity at a nominal cost.

It will be apparent that the aforedescribed device is subject to modification without departure from the invention. It is possible for example to exchange the functions of the cylinders 14 and 25 by appropriate rearrangement of the hydraulic pipe connections so that the "blast purge" cylinder may be used for secondary air compensation, and the secondary air cylinder for "blast purge" compensation.

Another embodiment of the invention, shown in Figs. 5 to 9 inclusive, functions to the same ends as the device described above. In this case, however, the control rod 41 for the generator blast control damper 42, which rod is operatively connected with the said damper through a damper lever 43 as illustrated, is connected directly to a piston 44 in a cylinder 45. The rod assembly 41 includes a rectangular turn buckle element 46 which slides in a guide member 47 of corresponding rectangular cross sectional form. The guide 47 is mounted for rotation in the fixed frame 48 of the apparatus and is provided at its upper end with a hand wheel 49 by means of which the said guide can be rotated. This rotation is accompanied necessarily by a corresponding rotation of the element 46 with the result that the connecting rod assembly 41 is reduced or increased in effective length depending upon the direction of said rotation. This affords a simple means for adjusting the operative positions of the damper 42 corresponding to the alternative positions of the plunger 44 at top and bottom respectively of the cylinder 45, and also for adjusting the damper to a fully closed position as hereinafter set forth.

Figure 8:
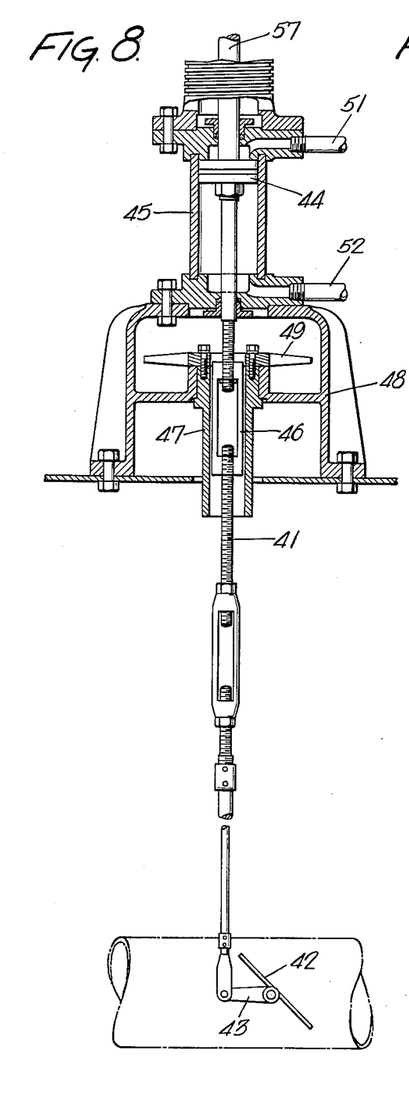
Fig. 8 is a fragmentary vertical sectional view of the apparatus illustrating a step in the operation.
Figure 11:
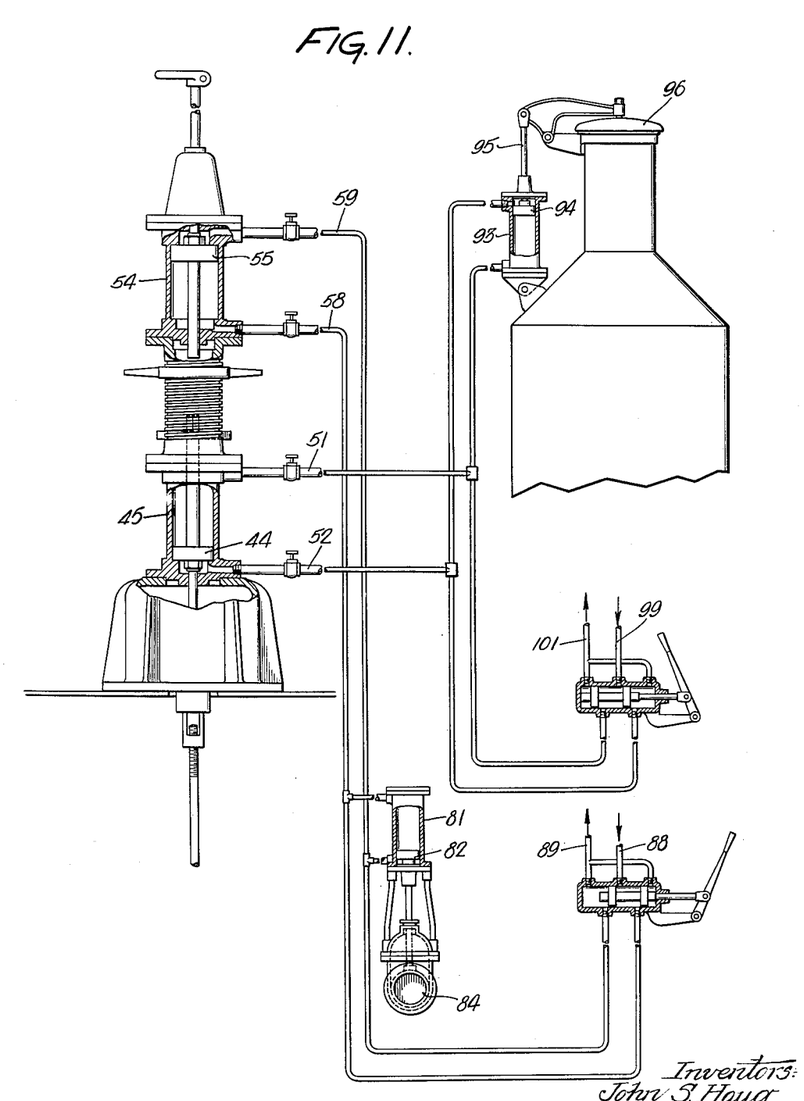
Fig. 11 is a diagrammatic view showing the hydraulic control system associated with the apparatus shown in Figs. 5 to 9 inclusive.

The cylinder 45 is connected in the pressure line of the stack valve after the manner of the cylinder 25 of the previously described embodiment and as illustrated in Fig. 11, wherein the stack and carburetter blast valves and their actuating cylinders and control valves are identified by the same reference numerals used in Fig. 10. In this case, however, when the stack valve is closed the piston 94 is at the top of the cylinder 93 and pressure is applied to the pipe 51 at the top of the cylinder 45. The pipe 52 at the lower end of the cylinder is then connected to the return line 101. Under these circumstances the piston 44 will be forced to the bottom of the cylinder as illustrated. When the stack valve is opened, however, the connections to the pipes 51 and 52 will be reversed so that the piston 44 will be elevated in the cylinder. It will be noted with the arrangement illustrated, that when the piston 44 is at the bottom of its cylinder 45, the damper 42 will be in a relatively wide open position within the blast duct, said duct being illustrated by broken lines at 53. When, on the other hand, the piston 44 is in the upper end of the cylinder 45, the damper will be moved to a partly closed position as illustrated in Fig. 8.

Figures 5, 6, 7:
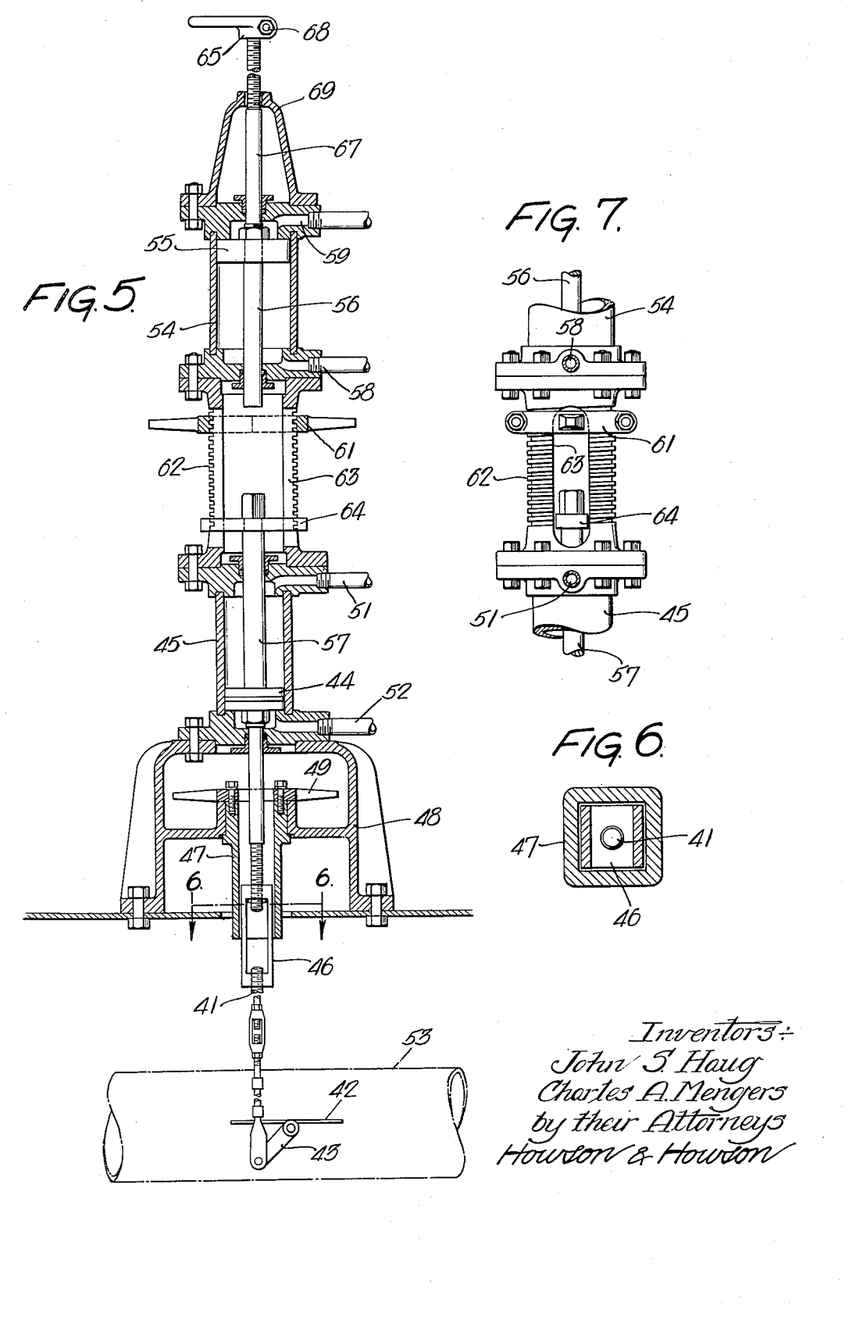
Fig. 5 is a vertical sectional view illustrating a modification within the scope of the invention.
Fig. 6 is a sectional view on the line 6—6, Fig. 5.
Fig. 7 is a fragmentary side elevational view of the apparatus shown in Fig. 5 illustrating a detail of the device.

With further reference to Figs. 5 and 11, a second cylinder 54 is mounted above and in alignment with the cylinder 45, and contained within this cylinder 54 is a piston 55. A piston rod 56 extends through the bottom of the cylinder so as to be in position for contact with the upper end of a piston rod 57 connected with the piston 44 and extending through the upper end of the cylinder 45. The piston 55 is of greater diameter than the piston 44 so that the former piston is capable of forcing the piston 44 downwardly in its cylinder to the bottom of the latter against an equal fluid pressure exerted through the pipe 52.

The cylinder 54 is connected in the hydraulic control system for the secondary or carburetter blast valve 84. The arrangement is such that this valve is closed when pressure is applied through the pipe 58 to the bottom of the cylinder 54 and to the top of the cylinder 81 (see Fig. 11). When the secondary blast valve is open, the fluid pressure will be applied to the cylinders through the pipe 59. Thus, the piston 55 will normally occupy a position at the lower end of the cylinder 54 during those periods when the secondary or carburetter blast is operating, and will occupy a position in the upper end of said cylinder when the carburetter blast valve is closed. Cylinder 54 through piston 55 thus has the effect of opening the generator blast damper by a downward thrust, when carburetter valve is opened, during the blast period. It has no effect during the run period because the damper is already wide open by action of the lower cylinder 45. In any case the carburetter blast valve does not operate during the run period. When carburetter blast valve is closed, the downward pressure of cylinder 54 is released, and the damper is returned to partly closed position by cylinder 45 through piston 44 because it is then relieved from the overpowering pressure of cylinder 54.

The travel of the piston 44 can be regulated by an adjustable stop 61 in the form of a collar threaded on the outside of an externally threaded portion 62 of the frame intermediate the cylinders 45 and 54. This threaded portion of the frame is slotted as indicated at 63 in Fig. 7 and within this slot is supported a cross bar 64 at the upper end of the piston rod 57. This bar comes into engagement with the under side of the stop nut 61 when the piston 44 is elevated in its cylinder and the nut thereby determines the extreme elevated position of the said piston in the cylinder. The travel of the piston 55 may also be regulated by an adjustable stop 65 on the upper threaded end of a piston rod 67 which extends upwardly from the piston 55. This stop, which is threaded on the rod 67, may be adjusted longitudinally of the latter and may be clamped in adjusted position by a clamping screw 68. The stop 65, as the piston 55 moves downwardly, is adapted to engage the upper end of an extension 69 of the frame and to thereby determine the lowermost position of the piston 55 in its cylinder.

The operation of this device is essentially the same as that of the aforedescribed embodiment. At the beginning of the "blow period" the piston 55 will be in the elevated position as also will be the piston 44 since the stack valve is opened and the secondary blast control valve is closed. The generator blast control damper 42 will be in the partly opened position as shown in Fig. 8. The opening of the carburetter blast valve to initiate the secondary blast will result in a movement of the piston 55 to the lower end of its travel in the cylinder 54 and this will also cause a depression of the cylinder 44 in the piston 45 to the lower end of the cylinder thereby adjusting the damper 42 to the widely opened position shown in Fig. 5. At the end of the "blow period" the carburetter blast valve will be closed with the result that the piston 55 will move to the upper end of its cylinder, and simultaneously with this upward movement of the piston 55, the piston 44 will also move to its upper position in the cylinder 45, this by reason of the fact that, the stack valve being open, fluid pressure has continued to be applied to the pipe 52 of the said cylinder. This results in a readjustment of the damper 42 to the partly closed position shown in Fig. 8 which reduces the generator blast rate to compensate for the shutting off of the secondary or carburetter blast.

The "blow run" is now initiated by closing the stack valve which results in a return of the piston 44 to the lower end of its cylinder and a consequent adjustment of the damper 42 again to the position shown in Fig. 5. This increases the generator blast damper opening to compensate for the increased back pressure resulting from the closing of the stack valve.

The "make run" is now instituted by interrupting the generator blast through the medium of the main blast control valve (not shown), and the introduction of steam as previously described. During this period the parts remain in the positions which they occupied at the end of the "blow run" and are therefore in proper position for initiation of the "blast purge" at the end of the gas making run. The "blast purge" is instituted by interrupting the steam admission and by opening the main generator blast valve with the stack valve still closed. At the end of the "blast purge," the stack valve is reopened with the result that the piston 44 is moved to the top of its cylinder 45 and the damper 42 adjusted to the partly opened position as shown in Fig. 8 which completes the cycle.

Figure 9:
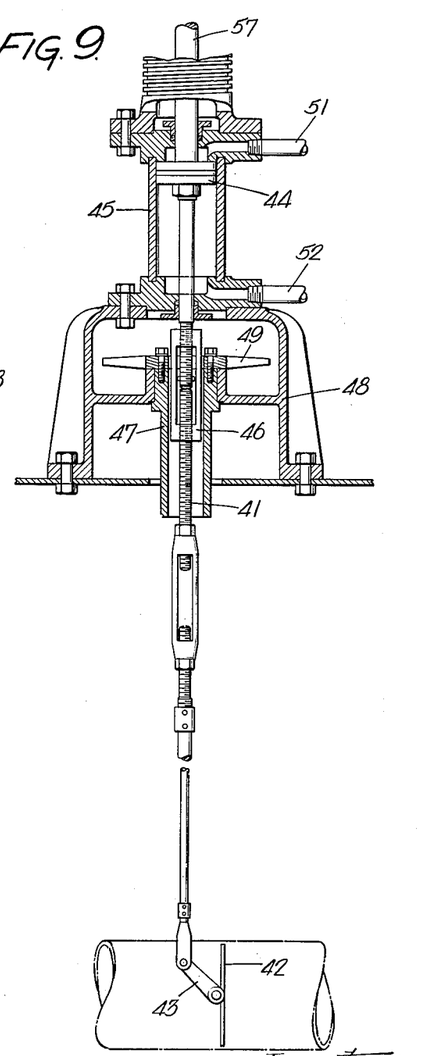
Fig. 9 is a similar view illustrating an adjustment of the device to effect a complete closure of the associated damper.

By reference to Fig. 9 it will be noted that from the partly closed position of the damper 42 as illustrated in Fig. 8 the said damper may be adjusted to a fully closed position by actuating the hand wheel 49 to rotate the sleeve 47 and the turn buckle element 46 so as to elevate the lower portion of the rod assembly 41. The turn buckle 46 is also used for regulating the damper opening to give the generator blast rate desired or to vary the setting from time to time as operating conditions may demand.

In detailing the operation of each of the aforedescribed embodiments of the invention, it has been assumed for convenience of description only that for efficient results the damper 42 need occupy only two different positions during the cycle of operations. It is to be noted, however, that the particular positions shown are solely for purposes of illustration and may vary considerably in actual practice. Furthermore it may and probably will be desirable to employ different positions of the damper for the "blow" with the secondary air valve open and "blow run" operations. The flexibility of adjustment required for these variables is provided for in both embodiments of the invention. Thus, with reference to Figs. 1 and 4, it is apparent that position "B" of the damper may be made to differ from position "D" by adjusting the "up" position of the piston 26 through the stop nut 36, or by adjusting the right hand position of the piston 13 through the screw 17. In the other embodiment the same difference in damper position may be accomplished by adjustment of the stop 65 to regulate the "down" position of the piston 55.

It is to be noted, also, with reference again to Fig. 1, that the basic rate of blast may be regulated through the hand wheel 22, and the compensating positions of the damper 42 then determined by individual adjustments of the travel of the cylinders 13 and 26 through the nut 36 and screw 17 respectively. This same effect is obtained in the device of Fig. 5 through the handwheel 49, regulating the basic rate, and the stops 65 and 61 which limit the movements of the pistons 55 and 44 respectively.

By the use of our invention, if desired, the same rate of primary air blasting may be maintained during (1) the blow (with the secondary air off), (2) the blow (with the secondary air on), and (3) the blow-run and/or blast purge (secondary air off and stack valve closed). On the other hand, any desired predetermined primary air blasting rate may be maintained during each of (1), (2), or (3), a different primary air blasting rate being employed in each of the three, or in any one of the three with respect to the other two.

Figure 12:
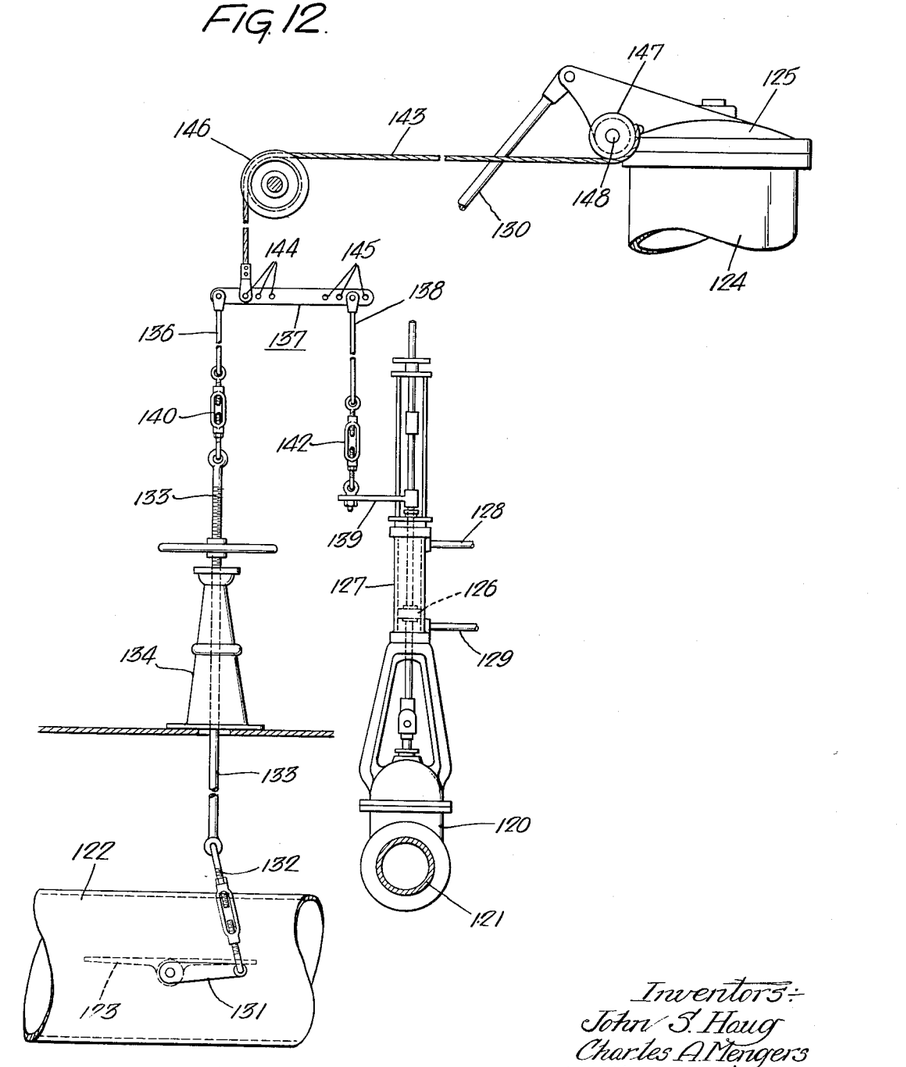
Fig. 12 is a diagrammatic elevational view illustrating another modification within the scope of the invention.

In the embodiment shown in Fig. 12, 120 indicates in general the carburetter blast valve of a carburetted water gas set, which controls the flow of secondary air to the set through the secondary air supply pipe 121. The pipe for supplying primary air for upwardly blasting the generator fuel bed is indicated at 122, and the supply is regulated by the damper 123. The superheater stack is shown at 124, and is provided with the stack valve generally indicated at 125.

The carburetter blast valve is positioned by operation of a piston 126 within an hydraulic cylinder 127, in response to hydraulic pressure supplied through connection 128 or 129, which connections may, for example, lead from a conventional "automatic control" (not shown), pressure being applied through connection 128 for closing and through connection 129 for opening the valve.

The stack valve 125, which is shown in the closed position, is actuated by the aforesaid "automatic control," acting through an hydraulic cylinder (not shown) connected with the valve through a rod 130.

The generator primary air blast damper 123 is positioned by actuation of the lever 131 by means of rod 132 and rod 133 which passes up through the generator blast control stand 134, the upper end of rod 133 being connected through rod 136 to one arm of lever 137. The piston rod of piston 126 is operatively connected to the other arm of lever 137 by means of rod 138 and arm 139. Turn-buckles 140 and 142 are provided for the purpose of adjustment.

The lever 137 is shown suspended from a cable 143, the pivotal connection between the cable and the lever providing a fulcrum therefor. The lever is shown provided with additional holes indicated at 144 and 145 for adjusting the effective lengths of the lever arms. The cable 143 passes over a pulley 146 to a sheave 147 rigidly attached to the stack valve 125 and centered on the stack valve pivot 148, in such a manner that the opening of the stack valve winds the cable over the sheave.

As the apparatus is illustrated, the carburetter blast valve 120 is in the closed position with the piston 126 in the lower end of hydraulic cylinder 127, the hydraulic pressure being supplied through connection 128. The stack valve 125 is shown closed and the generator primary air blast damper 123 is shown in the wide open position. These are the proper positions for the "blow run" or the "run," during which the main blast valve (not shown) is either closed in the "run," or open, in the "blow run." These positions of the elements are also correct for the "blast purge," which may follow the "run," and in which the main blast valve is open.

The opening of the stack valve 125 for the "blow" winds the cable 143 on the sheave 147 raising the fulcrum 144 of the lever 137, and by means of rod 136 raising rods 133 and 132, and through the lever 131 moving the primary air blast damper 123 toward the closed position. Subsequent opening of the carburetter blast valve 120 by reversal of the hydraulic pressure in connections 128 and 129 raises the rod 138 and the arm 139 permitting the downward movement of the short arm of lever 137 and the downward movement of rods 133 and 132 and through lever 131 permitting the damper 123 to assume a more open position.

At the end of the "blow," whether a "blow run" is employed or not, the closure of the carburetter blast valve by another reversal of the hydraulic pressure in connections 128 and 129, lowers rod 138 and arm 139, with respect to the fulcrum 144 of lever 137 and operates through lever 137 and rod 136 to raise rods 133 and 132 with respect to said fulcrum, and through lever 131 to move the damper 123 toward the closed position. However, the subsequent closure of the stack valve unwinds the cable 143, on the sheave 137, and causes the lowering of the fulcrum 144 and hence of the rod 136 and rods 133 and 132, and through lever 131 restores the damper 123 to the wide open position illustrated in Fig. 12.

In the event that a "blow run" is employed the main generator blast valve (not shown) remains open after the "blow," and in the event that a "blow run" is not employed the main generator blast valve closes at the end of the "blow."

In the embodiment of the invention shown in Fig. 13, 200 is a generator, 201 a carburetter, 202 a superheater and 203 a wash box of a carburetted water gas set. Gas connection 204 leads from the generator, above the fuel bed 205, to the carburetter top. Gas connection 206 leads from the carburetter base to the base of the superheater, and the latter is provided with a stack valve 207, and with a gas offtake 208, furnished with a valve 209 and leading to the wash box. From the wash box a gas offtake 211 leads to storage or other treatment or to utilization. A gas connection 212 (indicated in part by a dotted line) leads from the generator base to the wash box, and this connection is provided with a valve 213.

A blower 214 provides the air blast for blasting the generator with primary air, said air being conducted to the generator through pipes 215 and 216 and being regulated by a valve 217 and damper 218. The blower also provides secondary air through the pipes 215 and 219 for burning the generator blast gases, the said pipe 219 being controlled by a valve 221. As illustrated, the secondary air is supplied to the generator, above the fuel bed, through a bustle pipe 222 and a plurality of air inlets, one of which is indicated at 223.

A steam supply pipe 224, provided with a valve 225, supplies steam to the generator base for "up running." A steam supply pipe 226 also provided with a valve (not shown) supplies steam to the superheater top for "back running."

A supply pipe 228, provided with a valve 229 and spray 231, is arranged to spray fluid hydrocarbon material, such as petroleum oil, into the generator top; and a pipe 228a, provided with a spray (not shown), may be employed to spray fluid hydrocarbon material such as petroleum oil into the carburetter top.

A vent pipe 232 leads from the air blast pipe 215 and discharges to the atmosphere. Vent pipe 232 is provided with two valves, 233 and 234 respectively, arranged in series.

The various valves for controlling the flow of fluids to and from the set are diagrammatically illustrated as actuated by hydraulic cylinders in which pistons (not shown) are moved to open or close the valves in response to hydraulic pressure applied to the proper side of the piston, the pipe leading from the other side serving as a relief line. For convenience the fluid lines to many of the cylinders are only shown in part. The hydraulic cylinders operating the stack valve 207, the secondary air valve 221, and the vent pipe valves 233 and 234 are shown connected to the diagrammatically indicated automatic control machine 235, to which the cylinders of the other valves may also be considered as connected and which automatically applies the actuating pressure for the proper valve movement at the proper time in the cycle of operation.

The hydraulic cylinder 236 of valve 233 is connected by pipes 237 and 238, leading from opposite sides of the cylinder piston, to pipes 239 and 241 respectively, and the pipes 239 and 241 are connected to opposite sides of the piston of hydraulic cylinder 242 which actuates the secondary air blast valve 221, and connect said cylinder with the automatic control machine 235. The connections are such that when the automatic control machine applies fluid pressure through pipe 239 to close the secondary air valve 221, pressure is simultaneously applied through pipe 237 to open vent valve 233; and when the automatic control applies fluid pressure through pipe 241 to open secondary air valve 221, fluid pressure is simultaneously applied through pipe 238 to close valve 233.

Hydraulic cylinder 243 of valve 234 is connected by pipes 244 and 245, one on each side of its piston, with pipes 246 and 247 which lead from the automatic control machine 235 to opposite sides respectively of the piston of hydraulic cylinder 248 operatively associated with the stack valve 207. The connection is such that when fluid pressure is applied by the automatic control machine through pipe 246 to open stack valve 207, pressure is applied simultaneously through pipe 244 to open valve 234; and when pressure is applied through pipe 247 to close stack valve 207, pressure is simultaneously applied through pipe 245 to close valve 234.

In the operation of the apparatus in an illustrative cycle, assuming the "blow" to have begun, the primary air blast is supplied to the base of the fuel bed through pipe 216 as regulated by the setting of damper 218 (valve 217 being open and valve 213 closed). The resulting blast gases are burned with secondary air supplied to the generator top through pipe 219 (valve 221 being open). The burning blast gases pass through the carburetter and superheater and through the open stack valve 207 to the atmosphere (valve 208 being closed). During this operation heat is stored in the fuel bed and in the refractory heat storage material, such as refractory linings and/or checker brick, in the generator top, carburetter and superheater.

The automatic control machine during this operation directs the supply of fluid pressure, through pipe 241, to hold the secondary air valve 221 open and, through line 238, to hold the vent valve 233 closed, and also directs the supply of fluid pressure, through pipe 246, to hold stack valve 207 open, and, through pipe 244, to hold vent valve 234 open. Although valve 234 is open, valve 233 is closed and, therefore, no air is vented through vent pipe 232.

After the fuel bed and the carburetting zones have been raised to the desired temperatures, the blow is terminated and a "blow-run" begun by closing the secondary air valve 221, closing the stack valve 207, and opening valve 208 in the superheater gas offtake, the "blow-run" gas passing through the set without secondary combustion and thence through the wash box to storage. The closing of the secondary air valve, by fluid pressure applied through pipe 239, is accompanied by the supply of fluid pressure, through line 237, to open vent valve 233.

Due to the opening of valve 233 (valve 234 being already open) air is vented from blast pipe 215 to the atmosphere, so that the closing of the secondary air valve 221 does not increase the pressure differential across the fuel bed, and hence no surge of air through the fuel bed takes place.

The subsequent closure of the stack valve, by fluid pressure applied through pipe 247, is accompanied by the closure of valve 234 in response to fluid pressure applied through pipe 245. This closes the vent pipe 232 in spite of the open position of vent valve 233 and this provides increased primary blast pressure to overcome the greater resistance of the path of the "blow-run" gas through the wash box to storage, as compared with the lower resistance path through the stack valve to the atmosphere.

After the "blow-run," the primary air blast valve 217 is closed (secondary air valve 221 is already closed), valve 208 is opened, and the "run" begun by admitting steam to the generator base, through steam supply 224. The resulting "up-run" water gas, on issuing from the fuel bed and passing through the carburetter and superheater, is enriched with oil gas produced by the admission of petroleum oil to the generator top and/or to the carburetter and its vaporization and gasification by the heat stored in the generator top and/or the carburetter and superheater during the blow. The resulting carburetted water gas passes through the wash box to storage. After the "up-run" a "back-run" may be made by closing valve 208, opening valve 213, and admitting steam, through supply pipe 226, for passage reversely through the superheater, carburetter and generator fuel bed, the "back-run" water gas passing through connection 212 to the wash box and to storage. During this operation oil may be admitted to the generator and/or carburetter, if desired, and reformed in passage through the fuel bed.

During the "run," valve 233 in the vent pipe remains open. Since valve 207 is closed, valve 234 also remains closed in the operation of the apparatus thus far described. In such case the vent pipe is closed during the run. It may be preferred to have the vent pipe open during the run, in order to reduce the back pressure on the blower, in such case the following additional apparatus may be provided.

Hydraulic cylinder 260 may be provided, having a piston of greater area than the piston of cylinder 243, and attached to an extension 261 of the piston rod of cylinder 243. The cylinder 260, below the piston, is connected by fluid line 262 with pipe 263 which supplies the fluid pressure to operate cylinder 264 to close the primary air blast valve 217, and which fluid line acts as a relief line on the opening of valve 217 due to fluid pressure applied through line 265. Cylinder 260, above the piston, is provided with the vent pipe 266 leading to the atmosphere. Concurrently with the closure of valve 217, due to hydraulic pressure supplied through line 263, valve 234 is opened due to the application of hydraulic pressure through line 262 to cylinder 260, which because of its larger piston area, opens valve 234, in spite of the same pressure applied through line 245 to the smaller piston area of cylinder 243 and tending to hold valve 234 closed. In such case, during the "run," when valves 217 and 221 are closed, both vent valves 233 and 234 are open reducing the back pressure on the blower during the run period.

At the end of the "back-run," the supply of steam to the superheater top is cut off, and steam is admitted to the base of the fuel bed purging out the back-run pipe 212. Valves 208 and 213 may then be reversed, closing valve 213 and opening valve 208, and a short-up-run made, the resulting water gas passing through offtake 209 to the wash box and thence to storage.

A "blast purge" may then be made by cutting off the steam supply through pipe 224, and opening primary air blast valve 217, secondary air valve 221 and stack valve 207 remaining closed. The resulting blast gases push out of the set, by way of the wash box, the water gas remaining in the set after the run.

If hydraulic cylinder 269 and its connections are not employed, valve 234 is closed during the run and remains closed during the "blast purge" keeping the vent pipe 232 closed during this step of the cycle and maintaining the desired high blast pressure to overcome the resistance to the forcing of the water gas out through the seal into storage. If the cylinder 269 and its connections are employed, valves 233 and 234 are open during the run as previously described. In such case, the opening of the primary air blast valve, by fluid pressure applied to cylinder 264 through pipe 265, is accompanied by the relief of pressure in line 262, permitting the pressure applied through line 245 to cylinder 243 to close valve 234, closing the vent line 232, and providing for the desired high primary air blast pressure.

At the end of the "blast purge" stack valve 207 opens and valve 208 closes, the blast gases passing to the stack. The opening of the stack valve by fluid pressure supplied through line 246, is accompanied by the opening of vent valve 234. Valve 233 being already open, the vent line 232 is thus opened, reducing the primary air blast pressure somewhat from the higher pressure desired during the "blast purge." The secondary air valve 221 then opens to supply secondary air for the combustion of the blast gases issuing from the top of the fuel bed. With the opening of the secondary air valve by fluid pressure supplied through pipe 241, fluid pressure applied through pipe 233 closes vent valve 233, thereby closing vent line 232 and compensating for the opening of pipe 219 leading to the generator top. The opening of the secondary air valve is thus not accompanied by an undesirable drop in pressure differential across the fuel bed. The set is now again on the blow and the cycle is repeated.

The use of our invention in a blue water gas set will be readily understood by those skilled in the art without further detailed explanation, since in cyclic blue water gas operation the blast gases resulting from the primary air blast through the fuel bed are commonly burned with secondary air prior to passage through a waste heat boiler, and "blast purges" and/or "blow runs" are frequently employed, the latter particularly when bituminous coal is employed as the generator fuel.

In the apparatus particularly described above and illustrated in the figures, the coupling of the secondary air blast control mechanism and the stack valve mechanism with the means for regulating the primary air blast is mechanical or partly mechanical and partly hydraulic. It is to be understood, however, that these couplings, or either of them, may be, at least in part, electrical as, for example, by the aid of solenoids or synchronous motors, relays, etc. together with the necessary electrical circuits. It will be understood also that the term "damper" as used in the appended claims is to be interpreted in the broad sense as embracing both dampers and valves and any mechanical equivalent thereof.

These and other modifications will readily occur to those skilled in the art, upon becoming familiar with our invention, without departing from the spirit thereof.

We claim:

1. In a control mechanism of the character described, the combination with a cross head and means for guiding said cross head in a predetermined linear path, of a fluid-actuated piston operatively connected to said cross head, an actuated element, a second fluid-actuated piston, and transmission means movably mounted on said cross head and operatively connecting the said element with said second piston and, through said cross head, with the piston first-named, said transmission means forming a direct link between the said actuated element and the second piston for actuation of said element independently of the first piston.

2. In a control mechanism of the character described, a reciprocatory fluid-actuated piston, a cross head movable in a predetermined linear path, and means for operatively connecting the piston with the cross head, said means including a hollow piston rod, a rod slidably mounted in said piston rod and connected to said cross head, and adjustable means for immobilizing said rods with respect to each other.

3. In a control mechanism of the character described, a reciprocatory fluid-actuated piston, a cross head movable in a predetermined linear path, and means for operatively connecting the piston with the cross head, said means including a hollow piston rod, a rod slidably mounted in said piston rod and connected to said cross head, a nut element mounted on said piston rod for rotation about the longitudinal axes of said rods and having threaded engagement with said connecting rod, means for restraining said nut against axial movement on the piston rod, and means for rotating the nut to effect a relative axial adjustment of said rods.

4. In a control mechanism of the character described, a reciprocatory fluid-actuated piston, a cross head movable in a predetermined linear path, means for operatively connecting the piston with the cross head, said means including a hollow piston rod, a rod slidably mounted in said piston rod and connected to said cross head, and adjustable means for immobilizing said rods with respect to each other, a second fluid-actuated piston, a lever pivotally mounted on the cross head, a control element attached to said lever, and linkage means for operatively connecting the lever with said second piston.

5. In a control mechanism of the character described, a reciprocatory fluid-actuated piston, a cross head movable in a predetermined linear path, means for operatively connecting the piston with the cross head, said means including a hollow piston rod, a connecting rod slidably mounted in said piston rod and connected to said cross head, and means for adjustably immobilizing said rods with respect to each other, a second fluid-actuated piston, a lever pivotally mounted on the cross head, a control element attached to said lever, and linkage means for operatively connecting the lever with the said second piston, said linkage providing for movements of the cross head substantially independently of the said second piston.

6. In a control mechanism of the character described, the combination with an actuated element, of an actuating member for said element movable in a predetermined linear path, means for so moving said member, a bell crank lever pivotally attached to said member, one arm of said lever extending approximately in line with said linear movement, and another angularly disposed arm being connected to said element, and means connected to the first-named arm for actuating the lever to adjust the said element substantially independent of the adjustment resulting from the longitudinal movements of said member.

7. In a control mechanism of the character described, the combination with an actuated element, of an actuating member for said element movable in a predetermined linear path, means for so moving said member, a fluid-actuated piston movable in a path substantially at right angles to the direction of said linear movement, a lever pivotally attached to said member and extending from said pivot in a direction corresponding generally to the said linear movement, means including an elongated link extending substantially parallel to the path of said piston for operatively connecting the piston with said lever, and means for operatively connecting the lever with said element whereby actuations of said member and said lever may effect movements of said element in a substantially common path.

8. In a control mechanism of the character described, the combination with a movable control element, of a fluid-actuated piston and a rod connecting said piston with the element, said rod comprising separate sections and a turn buckle connecting said sections, means for actuating said buckle including a sleeve within which the said buckle is longitudinally adjustable, means for preventing rotation of the buckle in the sleeve, and means for rotating the sleeve.

9. In cyclically operated water gas apparatus having a generator adapted to contain an ignited bed of solid fuel and having air supply means for blasting the fuel bed with primary air and for burning the resulting producer gas with secondary air together with a stack valve operated by a pressure cylinder for controlling the venting of blast gases to the atmosphere, said air supply means including a secondary air conduit provided with a valve operated by a pressure cylinder for admitting and shutting off the flow of secondary air therethrough and a primary air conduit provided with valve means for admitting, regulating and shutting off the flow of primary air therethrough, and in which apparatus the rate of flow of primary air and resulting producer gas through the fuel bed tends to vary with the opening and closing of the secondary air and stack valves; the improvement which comprises power transmission mechanism operatively connected on the one hand through an additional pressure cylinder to the pressure cylinder of said secondary air valve and through another additional pressure cylinder to the pressure cylinder of said stack valve and on the other hand to said primary air regulating valve means to effect regulating movements of said primary air regulating valve means in a flow-restrictive direction upon the closing of said secondary air valve or upon the opening of said stack valve and in a flow-releasing direction upon the opening of said secondary air valve or upon the closing of said stack valve.

10. In cyclically operated water gas apparatus having a generator adapted to contain an ignited bed of solid fuel and having air supply means for blasting the fuel bed with primary air and for burning the resulting producer gas with secondary air together with a stack valve operated by a pressure cylinder for controlling the venting of blast gases to the atmosphere, said air supply means including a source of air under pressure, a secondary air conduit leading from said source and provided with a valve operated by a pressure cylinder for admitting and shutting off the flow of secondary air therethrough and a primary air conduit leading from said source and provided with valve means for admitting and shutting off the flow of primary air therethrough, and in which apparatus the rate of flow of primary air and resulting producer gas through the fuel bed tends to vary with changes in the positions of the secondary air and stack valves; the improvement which comprises a vent conduit leading off from said source upstream from the primary and secondary air valves, said vent conduit being provided with two valves arranged in series, each operated by a pressure cylinder, a fluid pressure transmission operatively connected on the one hand with the pressure cylinder of said secondary air valve and on the other hand with the pressure cylinder of one of said vent valves, and a fluid pressure transmission operatively connected on the one hand with the pressure cylinder of said stack valve and on the other hand with the pressure cylinder of the other vent valve, to effect regulating movements of one of said vent valves in a flow-restrictive direction upon fluid pressure action to close said secondary air valve and in a flow-releasing direction upon fluid pressure action to open said secondary air valve, and to effect regulating movements of the other of said vent valves in a flow-restricting direction upon fluid pressure action to close said stack valve and in a flow-releasing direction upon fluid pressure action to open said stack valve.

11. In cyclically operated water gas apparatus having a generator adapted to contain an ignited bed of solid fuel and having air supply means for blasting the fuel bed with primary air and for burning the resulting producer gas with secondary air together with a stack valve for controlling the venting of blast gases to the atmosphere, said air supply means including a secondary air valve for admitting and shutting off the flow of secondary air and primary air valve means for admitting, regulating and shutting off the flow of primary air, and in which apparatus the rate of flow of primary air and the resulting producer gas through the fuel bed tends to increase with the opening of said stack valve and with the closing of said secondary air valve and to decrease with the closing of said stack valve and with the opening of said secondary air valve; the improvement which comprises in combination a pressure cylinder having a piston operatively connected to said secondary air valve, a pressure cylinder having a piston operatively connected to said stack valve, two additional pressure cylinders each having a piston operatively connected to the primary air regulating valve means, said secondary air valve pressure cylinder and one of said additional pressure cylinders having interconnected pressure supply and release means, and said stack valve pressure cylinder and said other additional pressure cylinder having interconnected pressure supply and release means, said pressure supply and release interconnections and said operative connections to said primary air regulating valve means being such as to move said primary air regulating valve means toward a more closed position upon the application of pressure to close said secondary air valve or to open said stack valve and toward a more open position upon the application of pressure to open said secondary air valve or to close said stack valve.

12. Apparatus according to claim 11, in which the piston of one of said additional pressure cylinders is of larger effective area than the piston of the other, and in which a piston rod connected to said larger piston makes and breaks operative connection with said primary air regulating valve means through engagement and disengagement with a piston rod connected to said smaller piston, when in engagement overriding the response of said smaller piston to pressure applied thereto in a direction opposed to that applied to said larger piston.

13. Apparatus according to claim 11, in which said additional pressure cylinder having the piston of larger area is interconnected with the pressure supply and release means of the pressure cylinder operatively connected to the secondary air valve, and the additional pressure cylinder having the smaller piston is interconnected with the pressure supply and release means of the pressure cylinder operatively connected to the stack valve, and in which said additional pressure cylinders are mounted in tandem, said piston rod of said larger piston making engagement to effect the movement of said primary air regulating valve means by abutment longitudinally against the piston rod of said smaller piston.

14. In cyclicly operated water gas apparatus having a generator adapted to contain an ignited bed of solid fuel and having air supply means for blasting the fuel bed with primary air and for burning the resulting producer gas with secondary air together with stack valve means for controlling the venting of blast gases to the atmosphere, said air supply means including a source of air under pressure, a secondary air conduit provided with valve means for admitting and shutting off the flow of secondary air therethrough and a primary air conduit provided with valve means for admitting, regulating and shutting off the flow of primary air therethrough, and in which apparatus the rate of flow of primary air and resulting producer gas through the fuel bed tends to vary with changes in the positions of the secondary air and stack valves; the improvement which comprises a vent conduit provided with valve means for controlling the flow of air therethrough and leading off from said source on the upstream side of the secondary air and primary air valves, and power transmission mechanism operatively connected on the one hand to said secondary air valve means and said stack valve means and on the other hand to said vent valve means and operating automatically in response to the valve opening and valve closing actions of said secondary air and stack valve means respectively to effect regulating movements of said vent valve means in directions such as to oppose change in the rate of the flow of primary air and resulting producer gas through the fuel bed because of changes in the positions of said secondary air and stack valves.

15. In a control mechanism of the character described, the combination with a pair of motor devices, of a crosshead operatively connected with one of said motors for movement by the latter in a predetermined linear path, a motor actuated element, and a lever carried by and pivotally attached to the crosshead and connected to the other of said motors and to said element, said lever forming a link for direct transmission of movement between the last named motor and said element without affecting the position of the crosshead, and affording also an operative connection between the first named motor and the said element.

16. In a control mechanism of the character described, the combination with a fluid-actuated piston, of a crosshead movable by said piston in a predetermined linear path, a second fluid-actuated piston, a piston-actuated element, and a lever carried by and pivotally attached to the crosshead and connected to the second piston and to said element, said lever forming a link for direct transmission of movement between the second piston and said element without affecting the position of the crosshead, and affording also an operative connection between the first named piston and the said element.

17. A control mechanism according to claim 16 wherein means is provided for manual adjustment of the crosshead along its said linear path independently of and with respect to both of the said pistons.

18. In a control mechanism of the character described, the combination with an actuated element, of an actuating member movable in a predetermined linear path, means including a fluid-actuated piston for so moving said member, adjustable means for regulating the extent of the movement of said piston, a second fluid-actuated piston, and transmission means operatively connecting the second piston with the said element and including a link movably mounted on the said actuating member so as to afford direct transmission of movement between the second piston and the said element without affecting the position of the member, said link affording also an operative connection between the first named piston and the said element, and adjustable means for regulating the extent of the movement of said second piston.

JOHN S. HAUG.
CHARLES A. MENGERS.

REFERENCES CITED

The following references are of record in the file of this patent:

UNITED STATES PATENTS

| Number | Name | Date |
|---|---|---|
| 1,619,003 | Steere | Mar. 1, 1927 |
| 2,362,525 | Ashton | Nov. 14, 1944 |
| 2,383,277 | Stevens | Aug. 21, 1945 |

FOREIGN PATENTS

| Number | Country | Date |
|---|---|---|
| 23,904 | Great Britain | of 1896 |